UNITED STATES PATENT OFFICE 2,230,230

AQUEOUS DISPERSIONS OF TERPENE-MALEIC ANHYDRIDE, POLYHYDRIC ALCOHOL RESINS

Jesse Kenneth Boggs, Jamaica, N. Y., assignor to Hercules Powder Company, Wilmington, Del., a corporation of Delaware No Drawing. Application August 10, 1938,
Serial No. 224,112

13 Claims. (Cl. 260—31)

This invention relates to aqueous dispersions of synthetic resins of the terpene-maleic anhydride condensate, polyhydric alcohol type and to methods of their production.

Polybasic acid-polyhydric alcohol type resins are used to a great extent in the formulation of lacquers, varnishes and other types of coating compositions. Being insoluble in water, it is generally necessary to apply the resins from suitable organic solvents or mixtures of solvents. Such solvents are usually more or less inflammable and present numerous hazards in the preparation and use of the coating compositions. Moreover, such solvents ordinarily constitute a considerable part of the cost of the coating composition as, generally speaking, they are not recovered. In such cases where solvent recovery systems are in use, considerable expense is still involved through operation of the recovery system and loss of a portion of the solvent.

The preparation of aqueous solutions of polybasic acid-polyhydric alcohol resins of relatively high acid number has been disclosed in the prior art. More particularly, high acid number polybasic acid-polyhydric alcohol resins have been treated with water-soluble basic materials to produce water-soluble salts. Resins of relatively low acidity, to my knowledge, have not been used for such a purpose.

Moreover, in preparing solutions containing water-soluble salts of the high acid number polybasic acid-polyhydric alcohol resins according to the practices of the prior art, a relatively large amount of the basic material has been necessary due in part, to the high acidity. In the case wherein a volatile basic material is used, it is then necessary to submit the article coated with the aqueous composition to a comparatively long heating period to expel the basic material and deposit the water-insoluble resin. A disadvantage of extended heating of the salt of the polybasic acid-polyhydric alcohol resin is the discoloration which occurs. This is quite undesirable on coated surfaces of light color.

Now, I have found that most of the disadvantages of the prior art may be overcome and aqueous dispersions of polybasic acid-polyhydric alcohol resins of relatively low acid number may be prepared by using a resin in which the polybasic acid is a terpene-maleic anhydride condensate, such as described in United States Patents 1,993,025 and 1,993,031.

More specifically, I have found that aqueous dispersions of terpene-maleic anhydride, polyhydric alcohol resins may be produced by treating such resins in a fusible and ungelled state with an alkaline material which is capable of forming a water-soluble salt of the resin. The use of a terpene-maleic anhydride, polyhydric alcohol resin makes it possible to produce stable aqueous dispersions with resins of lower acid number than have been described heretofore. For example, I may prepare stable aqueous dispersions with resins of this specific type when the acid number is lower than 50. The process is not limited, however, to resins having such an acid number, but is operable with resins having acid numbers higher than 50.

Furthermore, I have found that the resins produced from terpene-maleic anhydride condensates require much less alkali to obtain dispersibility in water than is necessary with the higher acid number resins of the prior art and with resins containing other polybasic acids. As a direct result of the use of less alkali, I have found that when a volatile alkali such as ammonia is used with my low acid number resins, a milder heat treatment may be used to deposit the water-insoluble resin on the coated article. This reduces to a minimum any tendency to discolor.

The terpene-maleic anhydride condensate which I use in preparing the resins useful in this invention may be produced by the reaction of maleic anhydride with terpenes containing conjugated double bonds, such as alpha-terpinene, or with terpenes which do not contain conjugated double bonds, such as alpha-pinene, beta-pinene, dipentene, limonene, terpinolene, etc.

The terpene-maleic anhydride resins useful in this invention may be prepared by methods well known to the art. They may include reaction products of the terpene-maleic anhydride condensate with polyhydric alcohols such as glycerol, ethylene glycol, diethylene glycol, triethylene glycol, etc. The usual modifying agents such as natural resin acids, fatty acids and monobasic acids, in general, may be included in the resins where it is desirable to produce specific properties imparted by such agents.

In preparing the resins for use in this invention I preferably combine the reactants in such proportions as will produce low acid number resins without gelation. The esterification in every case is interrupted short of the gelation point. This feature of my invention is of importance, inasmuch as I have found that the presence of a gelled portion in my resin will cause an instability in the aqueous dispersion due presumably to the inability of such gelled resin to become emulsified or dissolved by addition of alkali. The resins which I employ are completely fusible, since they do not contain any gelled phase.

In carrying out the process of my invention for the preparation of aqueous resin dispersions I treat the resin with a water-soluble alkaline material capable of forming a water-soluble salt of the resin. I may use volatile alkalies such as ammonium hydroxide, alkali metal hydroxides such as sodium or potassium hydroxide, alkali carbonates, such as sodium carbonate, or water-soluble organic bases, such as alkylamines and alkylolamines, for example ethylamine, triethanolamine, diaminopropanol, butanolamine, etc., or heterocyclic amines, such as morpholine.

When a volatile alkali is used in the preparation of the aqueous dispersion the water-insoluble resin may be deposited on the article coated or impregnated with the dispersion by heating to remove the volatile alkali. When a non-volatile alkaline material has been used the water-insoluble resin may be deposited by treating the coated article with acidic materials, water-soluble metal salts, formaldehyde etc.

The alkaline material may be added directly to the resin or it may be added to the mixture of resin and water, or the resin may be added to an aqueous solution of the alkali. In using resins which are normally solid it is preferable to carry out the treatment above room temperature. In some instances, it may be found desirable to first dissolve the resin in a small amount of a solvent, such as, for example, acetone, alcohol, ethyl acetate, toluol, methyl ether of ethylene glycol, etc., and disperse the resin solution in water with the alkaline material.

I have also found it desirable in some instances to incorporate an amount of alkaline material which is insufficient to produce clear solutions. In such cases, the resin will be emulsified by the alkali salt of the portion of the resin which has combined with the alkali and an emulsion will result. When a sufficient amount of alkaline material is added to combine with all the resin, a clear aqueous solution will usually result. By the term "aqueous dispersion" I mean to include both the aqueous solutions and the emulsions formed in accordance with this invention.

Where desirable, I may include in my compositions modifying agents, such as, waxes, oils, plasticizers, tars, pigments, fillers, rubber, rubber derivatives, synthetic rubber-like products, synthetic or natural resins with acidities usually considered too low to be dispersible with alkali and water, small amounts of cellulose derivatives, etc. As waxes, I may use paraffin, carnauba wax, candelilla wax, montan wax, etc. As oils, I may use castor oil, linseed oil, soybean oil, corn oil, cottonseed oil, mineral oil, etc. Plasticizers which I may add are such materials as tricresyl phosphate, dibutyl phthalate, phthalyl ethyl blycollate, methyl abietate, hydrogenated methyl abietate, ortho- and para-toluene sulfonamide, etc. When such modifying substances are added they are usually emulsified by the water-soluble salt of the resin. They may be dissolved or dispersed in the resin prior to addition of the alkali or they may be dispersed in the alkaline solution or emulsified separately and the emulsion blended with the resin dispersion.

The aqueous dispersions produced in accordance with this invention are useful as adhesive agents for adhering such surfaces as paper to paper, paper to metal foil, paper to cellulose foil, and cellulose foil to cellulose foil, etc. They are also useful as surface coatings for paper, cellulose foils, metal, glass, wood, cloth, leather, artificial leather, etc. They have properties which render them advantageous in the sizing or impregnating of textile fabrics either when used alone or in conjunction with commonly used textile finishing agents, such as, for example, starch, gum arabic, tragacanth, casein, talc, clay, etc. In textile fabrics they impart greater flexibility, increased resistance to laundering and a binding action on the other finishing agents. They are useful for the binding of dry colors and pigments in printing, imparting wet rub resistance. The aqueous resin dispersions also are useful in the pulping of paper. When added to the pulp in the beater and subsequently precipitated with alum they produce a paper having superior strength. The aqueous resin dispersions may be added to the pulp in the beater together with paraffin emulsions to reduce tack or with latex emulsions to increase the film strength.

As illustrative of the practical adaptation of this invention, using as the resin the reaction product of ethylene glycol and the condensation product of maleic anhydride and a terpene cut boiling within the range 182° C. to 190° C., and consisting largely of terpinolene, the following is cited:

Example I

One hundred parts by weight of the condensation product of maleic anhydride and a terpene cut boiling within the range 182° C. to 190° C. as described in U. S. Patent 1,993,031, to Ernest G. Peterson, and 36 parts by weight of ethylene glycol were heated together with agitation at a temperature of about 205° C. to about 215° C. for approximately 7 hours. Excess glycol was then removed under reduced pressure. The resin resulting from such a treatment had an acid number of about 43 and a melting point (Hercules drop method) of about 98° C. To 800 parts by weight of the above resin in molten condition, 1600 parts by weight of water and 76 parts by weight of 28 per cent aqueous ammonia were added, while heating and stirring were continued. As a result, the water-insoluble resin dissolved completely in the water, forming a clear aqueous solution which could be diluted indefinitely with water containing a small amount of ammonia. It also exhibited excellent stability over long storage tests. The ammonia required to produce the water solution was about 0.018 pound for one pound of resin.

To demonstrate the advantage of preparing the aqueous resin solution from a resin containing the terpene-maleic anhydride condensate, as above, over a similar resin containing phthalic anhydride, a resin was prepared from 100 parts by weight of phthalic anhydride and 54.3 parts by weight of ethylene glycol having an acid number of 45 and a melting point of 53° C. One hundred parts by weight of this resin in molten condition were treated with 200 parts by weight of water and 45 parts by weight of 28 per cent by weight ammonia with heating and stirring. No solution could be induced, instead separation into two immiscible layers occurred.

As a further example of a water solution of a resin containing a terpene-maleic anhydride condensate, the following is illustrative:

Example II

One hundred parts by weight of the condensation product of maleic anhydride and a terpene cut boiling within the range 182° C. to 190° C. and 73.3 parts by weight of triethylene glycol were heated together at a temperature of 210-220° C. for about 6 hours, and excess glycol then removed under reduced pressure. The resulting resin had an acid number of about 35 and was a soft balsam. To 800 parts by weight of the above resin, heated so as to render it molten, 20.7 parts by weight of 28 per cent ammonia and 800 parts by weight of water were first added with stirring. Then another 800 parts by weight of water and 20.7 parts by weight of 28 per cent ammonia were added with stirring. As the result of this treatment the resin dissolved in water to give a clear, stable solution which could be diluted with a large amount of dilute ammonia water without separation. The ammonia required was about 0.007 lb. for one lb. of resin.

To demonstate further the advantages of the resin containing the terpene-maleic anhydride condensate, as above, over a similar polybasic acid-polyhydric alcohol resin containing phthalic anhydride the following test is illustrative:

A resin was prepared from 100 parts by weight of phthalic anhydride and 116 parts by weight of triethylene glycol by heating at a temperature of 205° C. to 215° C. for about 4 hours, unreacted materials then being removed under reduced pressure. The resin resulting from such treatment had an acid number of 46 and was a viscous liquid. Then, 100 parts by weight of the resin were heated to 150° C. and 200 parts by weight of boiling water added, followed by gradual addition with stirring of 46 parts by weight of 28 per cent ammonia. Solution of the resin could not be induced even under such a drastic treatment, separation into two immiscible layers occurring. Further additions of ammonia had no effect.

As a further example of the practical adaptation of this invention the following example is cited:

Example III

One hundred parts by weight of the condensation product of terpinolene and maleic anhydride, as described in U. S. Patent 1,993,031, to Ernest G. Peterson, and 51 parts by weight of diethylene glycol were heated at a temperature of 205° C. to 215° C. for about 6 hours. After removal of excess glycol under reduced pressure, the resulting resin had an acid number of about 42 and a melting point of about 71° C. To 800 parts by weight of the above resin at 130° C. to 140° C., 18 parts by weight of 28 per cent ammonia were added with stirring, followed by addition of 1000 parts by weight of water at a temperature of about 85° C. Then 600 parts additional water and 15 parts additional ammonia were added. A clear solution resulted which was very stable. It could be diluted with dilute ammonia water without separation. The ammonia necessary to produce such a stable aqueous solution was about 0.008 pound for each pound of resin.

As a further example illustrating the use of a modifying agent in the aqueous dispersion the following is cited:

Example IV

Two hundred and seventy parts by weight of the resin produced as in Example I by the reaction of ethylene glycol with a terpene-maleic anhydride condensate and 30 parts by weight of butyl phthalyl butyl glycollate were heated together to about 100° C. to produce a molten mixture. Then a hot solution of 10 parts by weight of sodium hydroxide in 200 parts by weight of water was added and the mixture heated with agitation at a temperature of 90 to 100° C. for about 35 minutes. The viscous product obtained by the above treatment was a stable aqueous dispersion of the plasticized resin.

It will be understood that the details and specific examples hereinbefore set forth are for purposes of illustration only, and are not in limitation of the invention herein broadly described and claimed.

In the claims where I refer to terpene-maleic anhydride condensates it is to be understood that I refer to the compositions described broadly in U. S. Patents 1,993,025 and 1,993,031.

What I claim and desire to protect by Letters Patent is:

1. An aqueous dispersion comprising a fusible and ungelled terpene-maleic anhydride, polyhydric alcohol resin having an acid number below about 50 dispersed in water by means of an alkaline material capable of forming a water-soluble salt of the said resin.

2. An aqueous dispersion comprising a fusible and ungelled terpene-maleic anhydride, polyhydric alcohol resin having an acid number below about 50 dispersed in water by means of an alkali metal base.

3. An aqueous dispersion comprising a fusible and ungelled terpene-maleic anhydride, polyhydric alcohol resin having an acid number below about 50 dispersed in water by means of sodium hydroxide.

4. An aqueous dispersion comprising a fusible and ungelled terpene-maleic anhydride, polyhydric alcohol resin having an acid number below about 50 dispersed in water by means of ammonium hydroxide.

5. An aqueous dispersion comprising a fusible and ungelled terpene-maleic anhydride, glycol resin having an acid number below about 50 dispersed in water by means of an alkaline material capable of forming a water-soluble salt of the said resin.

6. An aqueous dispersion comprising a fusible and ungelled terpene-maleic anhydride, polyhydric alcohol resin having an acid number below about 50 and a modifying agent dispersed in water by means of an alkaline material capable of forming a water-soluble salt of the said resin.

7. An aqueous dispersion comprising a fusible and ungelled terpene-maleic anhydride, glycol resin having an acid number below about 50 dispersed in water by means of an alkali metal base.

8. An aqueous dispersion comprising a fusible and ungelled terpene-maleic anhydride, glycol resin having an acid number below about 50 dispersed in water by means of ammonium hydroxide.

9. The process of producing an aqueous dispersion of a fusible and ungelled terpene-maleic anhydride, polyhydric alcohol resin having an acid number below about 50 which comprises treating the said resin with water and an alkaline material capable of forming a water-soluble salt of the said resin.

10. The process of producing an aqueous dispersion of a fusible and ungelled terpene-maleic anhydride, polyhydric alcohol resin having an acid number below about 50 which comprises treating the said resin with water and an alkali metal base.

11. The process of producing an aqueous dispersion of a fusible and ungelled terpene-maleic anhydride, polyhydric alcohol resin having an acid number below about 50 which comprises treating the said resin with water and sodium hydroxide.

12. The process of producing an aqueous dispersion of a fusible and ungelled terpene-maleic anhydride, polyhydric alcohol resin having an acid number below about 50 which comprises treating the said resin with water and ammonium hydroxide.

13. The process of producing an aqueous dispersion of a fusible and ungelled terpene-maleic anhydride, glycol resin having an acid number below about 50 which comprises treating the said resin with water and alkaline material capable of forming a water-soluble salt of the said resin.

JESSE KENNETH BOGGS.